United States Patent
Cai et al.

(10) Patent No.: US 11,348,260 B2
(45) Date of Patent: May 31, 2022

(54) METHODS AND DEVICES FOR ENCODING AND RECONSTRUCTING A POINT CLOUD

(71) Applicant: INTERDIGITAL VC HOLDINGS, INC., Wilmington, DE (US)

(72) Inventors: Kangying Cai, Rennes (FR); Sebastien Lasserre, Thorigné Fouillard (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/624,639

(22) PCT Filed: Jun. 18, 2018

(86) PCT No.: PCT/EP2018/066046
§ 371 (c)(1),
(2) Date: Dec. 19, 2019

(87) PCT Pub. No.: WO2018/234206
PCT Pub. Date: Dec. 27, 2018

(65) Prior Publication Data
US 2020/0219275 A1    Jul. 9, 2020

(30) Foreign Application Priority Data

Jun. 22, 2017   (EP) .................................... 17305770

(51) Int. Cl.
*G06T 7/50*        (2017.01)
*G06T 7/10*        (2017.01)
(Continued)

(52) U.S. Cl.
CPC .................. *G06T 7/50* (2017.01); *G06T 7/10* (2017.01); *G06T 9/00* (2013.01); *G06T 11/006* (2013.01);
(Continued)

(58) Field of Classification Search
CPC .... G06T 7/50; G06T 7/10; G06T 9/00; G06T 11/006; G06T 17/205; G06T 2207/10028; G06T 9/40; H04N 19/96; H04N 19/593
See application file for complete search history.

(56) References Cited

U.S. PATENT DOCUMENTS 9,035,807 B2   5/2015   Jiang et al.
9,111,333 B2   8/2015   Jiang et al.
(Continued)

FOREIGN PATENT DOCUMENTS

CN      103247075 B   *   8/2015
CN      104821015 A   *   8/2015
(Continued)

OTHER PUBLICATIONS

Golla et al., "Real-time Point Cloud Compression", 2015 IEEE/RSJ International Conference on Intelligent Robots and Systems (IROS), Hamburg, Germany, Sep. 28, 2015, 6 pages.
(Continued)

*Primary Examiner* — Matthew C Bella
*Assistant Examiner* — Kathleen M Broughton
(74) *Attorney, Agent, or Firm* — Condo Roccia Koptiw LLP

(57) ABSTRACT

This method for encoding a 3D point cloud comprises: —segmenting the point cloud into first patches (2); —determining inverse projection parameters of the patches (4); —projecting the first patches to planes using the inverse projection parameters (10); —encoding the planes (12); —determining sparse points in the point cloud not belonging to any patch (HC, 18); and—encoding the sparse points using an octree-decomposition (20).

16 Claims, 5 Drawing Sheets

(51) Int. Cl.
*G06T 9/00* (2006.01)
*G06T 11/00* (2006.01)
*G06T 17/20* (2006.01)

(52) U.S. Cl.
CPC .. *G06T 17/205* (2013.01); *G06T 2207/10028* (2013.01)

(56) References Cited

U.S. PATENT DOCUMENTS

| | | | |
|---|---|---|---|
| 9,214,042 | B2 | 12/2015 | Cai et al. |
| 2009/0018801 | A1 | 1/2009 | Gladkova et al. |
| 2009/0244062 | A1* | 10/2009 | Steedly ................ G06T 15/205 345/420 |
| 2013/0155058 | A1* | 6/2013 | Golparvar-Fard ...... G06T 17/00 345/419 |
| 2015/0213572 | A1* | 7/2015 | Loss ........................ G06T 7/12 345/420 |
| 2015/0220812 | A1 | 8/2015 | Curington |
| 2016/0203387 | A1* | 7/2016 | Lee .......................... G06T 7/73 348/44 |

FOREIGN PATENT DOCUMENTS

| | | | |
|---|---|---|---|
| CN | 105528082 | A * | 4/2016 |
| CN | 105006021 | B * | 10/2016 |

OTHER PUBLICATIONS

Ainala et al., "Plane Projection Approximation and Learning Based Voxel Geometry Compression", International Organization on Standardization, ISO/IEC JTC1/SC29/WG11, Coding of Moving Pictures and Audio, ISO/IEC JTC1/SC29/WG11 MPEG2012/M38816, Geneva, Switzerland, May 2016, 6 pages.

Ainala et al., "An Improved Enhancement Layer for Octree Based Point Cloud Compression with Plane Projection Approximation", Proceedings of the SPIE, vol. 9971, Sep. 2016, 9 pages.

Ochotta et al., "Compression of Point-Based 3D Models by Shape-Adaptive Wavelet Coding of Multi-Height Fields", Proceedings of the First Eurographics Conference on Point-Based Graphics, Zurich, Switzerland, Jun. 2, 2004, pp. 103-112.

Liu et al., "Error-based Segmentation of Cloud Data for Direct Rapid Prototyping", Computer-Aided Design, vol. 35, No. 7, Jun. 2002, pp. 633-645.

Kathariya et al., "Plane Projection Approximation for Voxel Color Attribute Compression", International Organization on Standardization, ISO/IEC JTC1/SC29/WG11, Coding of Moving Pictures and Audio, ISO/IEC JTC1/SC29/WG11 MPEG2012/M38801, Geneva, Switzerland, May 2016, 5 pages.

Anonymous, "Current Status on Point Cloud Compression", International Organization on Standardization, ISO/IEC JTC 1/SC 29/WG 11, Coding of Moving Pictures and Audio, ISO/IEC JTC 1/SC 29/WG 11 N15869, Geneva, Switzerland, Oct. 2015, 11 pages.

Isenburg, Martin, "LASzip: Lossless Compression of LIDAR Data", Photogrammetric Engineering and Remote Sensing, vol. 79, No. 2, Feb. 2013, 9 pages.

Lien et al., "Model Driven Compression of 3-D Tele-Immersion Data", University of California at Berkeley, Electrical Engineering and Computer Science, Technical Report No. UCB/EECS-2006-170, Dec. 12, 2006, 12 pages.

Peng et al., "Geometry-guided Progressive Lossless 3D Mesh Coding with Octree (OT) Decomposition", ACM Transactions on Graphics, vol. 24, No. 3, Jul. 2005, pp. 609-616.

Morell et al., "Geometric 3D Point Cloud Compression", Pattern Recognition Letters, vol. 50, Jun. 12, 2014, pp. 55-62.

Ochotta et al., "Image-Based Surface Compression", Computer Graphics Forum, vol. 27, No. 6, Sep. 2008, pp. 1647-1663.

Kammerl et al., "Real-time Compression of Point Cloud Streams", 2012 IEEE International Conference on Robotics and Automation (ICRA), Saint Paul, Minnesota, USA, May 14, 2012, pp. 778-785.

Mekuria et al., "A Basic Geometry Driven Mesh Coding Scheme with Surface Simplification for 3DTI", IEEE Communications Society, Multimedia Communications Technical Committee E-Letter, vol. 9, No. 3, May 2014, pp. 6-8.

Digne et al., "Self-similarity for Accurate Compression of Point Sampled Surfaces", Computer Graphics Forum, vol. 33, No. 2, May 2014, pp. 155-164.

De Queiroz et al., "Compression of 3D Point Clouds Using a Region-Adaptive Hierarchical Transform", IEEE Transactions on Image Processing, vol. 25, No. 8, Aug. 2016, pp. 3947-3956.

* cited by examiner

METHODS AND DEVICES FOR ENCODING AND RECONSTRUCTING A POINT CLOUD

This application claims the benefit, under 35 U.S.C. § 365 of International Application PCT/EP2018/066046, filed Jun. 18, 2018, which was published in accordance with PCT Article 21(2) on Dec. 27, 2018, in English, and which claims the benefit of European Patent Application No. 17305770.4, filed Jun. 22, 2017.

TECHNICAL FIELD

The present disclosure generally relates to the field of point cloud data sources.

More particularly, it deals with point cloud compression (PCC).

Thus, the disclosure concerns a method for encoding a point cloud and a corresponding encoder. It also concerns a method for reconstructing a point cloud and a corresponding decoder. It further concerns computer programs implementing the encoding and reconstructing methods of the invention.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A point cloud consists of a set of points. Each point is defined by its spatial location (x, y, z), i.e. geometry information in the (X,Y,Z) coordinate system, or any other coordinate system, such as the polar system, and different attributes, which typically include the color information in (R, G, B) or (Y, U, V) or any other color coordinate system.

Point cloud data sources are found in many applications. Important applications relying on huge point cloud data sources can be found in geographic information systems, robotics, medical tomography and scientific visualization.

Beyond these applications that are more industrial and scientifically oriented, the rise in popularity of inexpensive 3D scanners based on time of flight or other depth sensing technologies, 3D capturing on mobile devices and the rise of cloud based 3D printing are creating a huge demand for large scale interoperable compressed 3D point cloud storage and transmission data formats in the consumer market.

Scanned 3D point clouds often have thousands of points and occupy large amounts of storage space. Additionally, they can be generated at a high rate when captured live from 3D scanners, increasing the storage requirements even further. Therefore, point cloud compression is critical for efficient networked distribution and storage.

Different compression methods of point clouds have been proposed in the prior art.

The first compression method is based on the octree based point-cloud representation. It is described, for instance, in J. Peng and C.-C. Jay Kuo, "Geometry-guided progressive lossless 3D mesh coding with octree (OT) decomposition," ACM Trans. Graph, vol. 21, no. 2, pp. 609-616, July 2005.

An octree is a tree data structure where every branch node represents a certain cube or cuboid bounding volume in space. Starting at the root, every branch has up to eight children, one for each sub-octant of the node's bounding box.

An example is shown in FIG. 1 and the left half of FIG. 2.

For compression, a single bit is used to mark whether every child of a branch node is empty and then this branch node configuration can be efficiently represented in a single byte, assuming some consistent ordering of the eight octants. By traversing the tree in breadth-first order and outputting every child node configuration byte encountered, the point distribution in space can be efficiently encoded. Upon reading the encoded byte stream, the number of bits set in the first byte tells the decoder the number of consecutive bytes that are direct children. The bit positions specify the voxel/child in the octree they occupy. The right half side of FIG. 2 illustrates this byte stream representation for the octree in the left half.

Due to its hierarchical nature, the octree representation is very efficient in exploiting the sparsity of point clouds. Thus, octree decomposition based strategy is very efficient for compressing sparse point clouds. However, octree-based representation is inefficient for representing and compressing dense point clouds.

The second compression method is based on the segmentation based point cloud representation. It is described, for instance, in T. Ochotta and D. Saupe, "Compression of point-based 3d models by shape-adaptive wavelet coding of multi-heightfields," in Proc. Eurographics Symp. on Point-Based Graphics, 2004, and in J. Digne, R. Chaine, S. Valette, et al, "Self-similarity for accurate compression of point sampled surfaces," Computer Graphics Forum, vol. 33, p. 155-164, 2014.

The segmentation based point cloud representation comprises three steps: plane-like decomposition, plane projection and coding. In the first step, the point cloud data is segmented into plane-like patches. Then the resultant patches are projected onto one or several planes. In the last step, the projected image(s) are compressed. Efficient image/video compression techniques can be used for compressing the projected map(s).

Plane-like segmentation based PCC has been proved to be very efficient at coding dense point clouds which represent approximate piecewise linear surfaces. However, there are several disadvantages of segmentation-based PCC. Indeed, this method requires resampling onto a regular grid, which introduces approximation errors. Also, it is necessary to generate many patches for complex shapes which implies a high computation complexity for complicated texture.

There are works trying to combine the advantages of the above two representations of point clouds such as J. K. N. Blodow, R. Rusu, S. Gedikli and E. S. M Beetz, "Real-time compression of point cloud streams," in *Robotics and Automation (ICRA)*, 2012 IEEE International Conference on, pp. 778,785, 14-18 May 2012.

These works first decompose the input point clouds in the manner of octree decomposition. After each cuboid division operation, it is checked whether the points falling into the same newly generated leaf cuboid can be approximated by a plane. If the answer is yes, the division of the corresponding cuboid is stopped and the related points are encoded by projecting on the corresponding plane. Then, the positions of the plane-like patches can be efficiently represented and compressed by the octree method. However, both the scale and position of the resultant plane-like patches are constrained by the octree decomposition step. The piece-wise linear characteristics of the point cloud cannot be fully exploited.

SUMMARY

The present disclosure proposes a solution for improving the situation.

Accordingly, the present disclosure provides a method for encoding a 3D point cloud comprising:
- segmenting the point cloud into first patches;
- determining inverse projection parameters of the patches;
- projecting the first patches to planes using the inverse projection parameters;
- encoding the planes;
- determining sparse points in the point cloud not belonging to any patch; and
- encoding the sparse points using an octree-decomposition.

Thus, the encoding method of the present disclosure combines the segmentation and octree compression techniques. By first segmenting the point cloud, its piece-wise linearity can be fully exploited using the plane-like patches. At the same time, the encoder also takes advantage from the high efficiency of the octree based point cloud compression when compressing a sparsely distributed point cloud. This is achieved through the use of the octree compression only for the encoding of the sparse points still not encoded after the segmentation. Thus, plane-like patches can be as large as possible, as they are not constrained by the octree-based space decomposition like in the prior art. Therefore, the number of patches can be decreased, and the performance of the codec can be optimized.

The points not belonging to any plane-like patch are called high-curvature points.

The present disclosure also provides a device for encoding a 3D point cloud, comprising:
- a segmentation module configured to segment the point cloud into patches;
- a projection module configured to determine inverse projection parameters of the patches and to project the patches to planes using inverse projection parameters;
- a first coding module configured to encode the planes;
- a computation module configured to determine sparse points in the point cloud; and
- a second coding module (40) configured to encode the sparse points using an octree-decomposition.

These encoder modules are advantageously implemented by one or more processors within the encoder.

According to an embodiment, the encoding method includes steps for and the encoding device includes means for:
- reconstructing second patches from the encoded planes;
- comparing the second patches and the first patches in order to obtain, for each point in the first patches, a reconstruction error; and
- comparing, for each point in the first patches, the reconstruction error to a threshold.

Advantageously, the sparse points include residual points for which the reconstruction error is larger than the threshold.

By including the residual points in the sparse points which are encoded using the octree decomposition technique, the encoding is improved.

Advantageously, the inverse projection parameters include positions and/or orientations of the patches.

According to an embodiment, the encoding method includes steps for and the encoding device includes means for encoding the inverse projection parameters.

Advantageously, the encoding method includes steps for and the encoding device includes means for decoding the encoded inverse projection parameters.

Preferably, projecting the first patches to planes uses the decoded inverse projection parameters.

The present disclosure also provides a method for reconstructing a 3D point cloud, comprising:
- receiving an encoded bitstream including encoded planes and encoded sparse points;
- decoding the received encoded bitstream;
- reconstructing patches of the point cloud.

The present disclosure also provides a device for reconstructing a 3D point cloud, including:
- a receiver configured to receive an encoded bitstream including encoded planes and encoded sparse points;
- a decoding module configured to decode the received encoded bitstream; and
- a reconstruction module configured to reconstruct patches of the point cloud.

These decoder modules are advantageously implemented by one or more processors within the decoder.

Advantageously, the encoded bitstream includes encoded inverse projection parameters and the reconstructing includes decoding the encoded inverse projection parameters.

The methods according to the disclosure may be implemented in software on a programmable apparatus. They may be implemented solely in hardware or in software, or in a combination thereof.

Since the present invention can be implemented in software, the present invention can be embodied as computer readable code for provision to a programmable apparatus on any suitable carrier medium. A carrier medium may comprise a storage medium such as a floppy disk, a CD-ROM, a hard disk drive, a magnetic tape device or a solid state memory device and the like.

The disclosure thus provides a computer-readable program comprising computer-executable instructions to enable a computer to perform the encoding method of the disclosure.

The diagram of FIG. 3 illustrates an example of the general algorithm for such computer program.

The disclosure also provides a computer-readable program comprising computer-executable instructions to enable a computer to perform the reconstructing method of the invention.

The diagram of FIG. 5 illustrates an example of the general algorithm for such computer program.

The present disclosure also provides a non-transitory computer readable medium containing data content generated according to the encoding method or by the encoding device of the disclosure.

The present disclosure also provides a signal comprising data generated according to the encoding method or by the encoding device of the disclosure.

BRIEF DESCRIPTION OF THE DRAWINGS

The present invention is illustrated by way of examples, and not by way of limitation, in the figures of the accompanying drawings, in which like reference numerals refer to similar elements and in which.

DETAILED DESCRIPTION OF PREFERRED EMBODIMENTS

Figure 1:
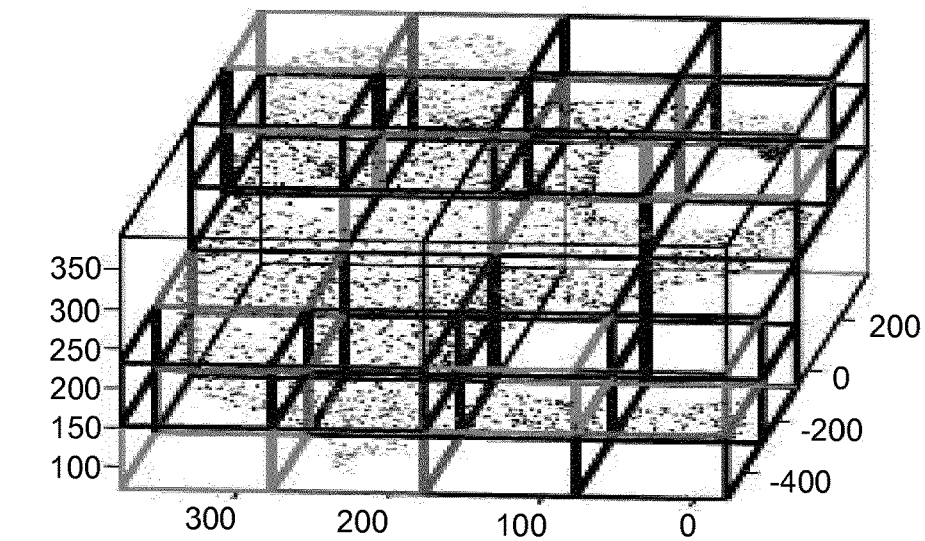
FIG. 1, already described, is a schematic view illustrating an octree-based point cloud representation according to the prior art.
Figure 1:
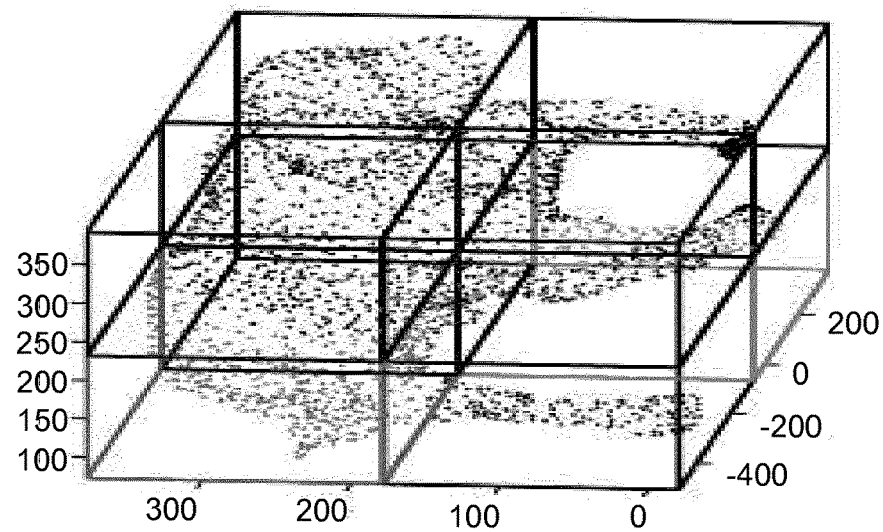
Figure 1:
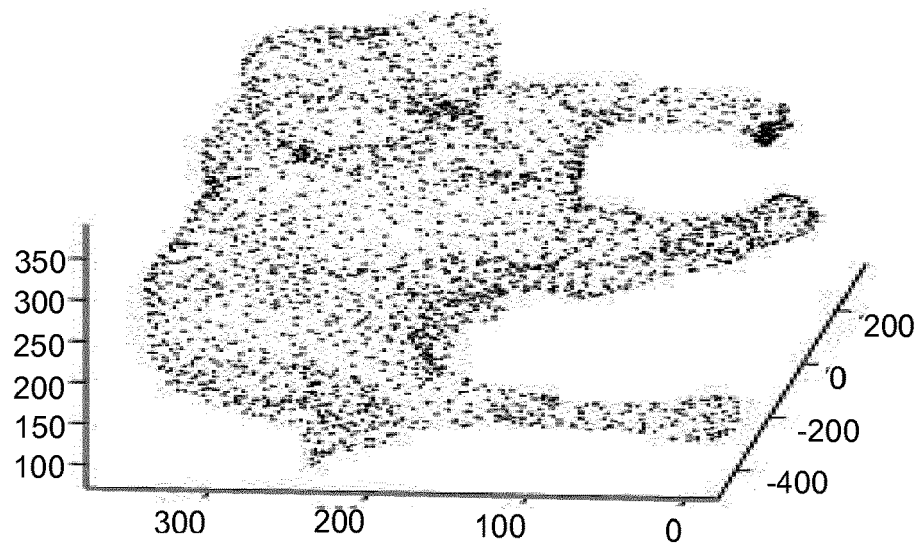
Figure 2:
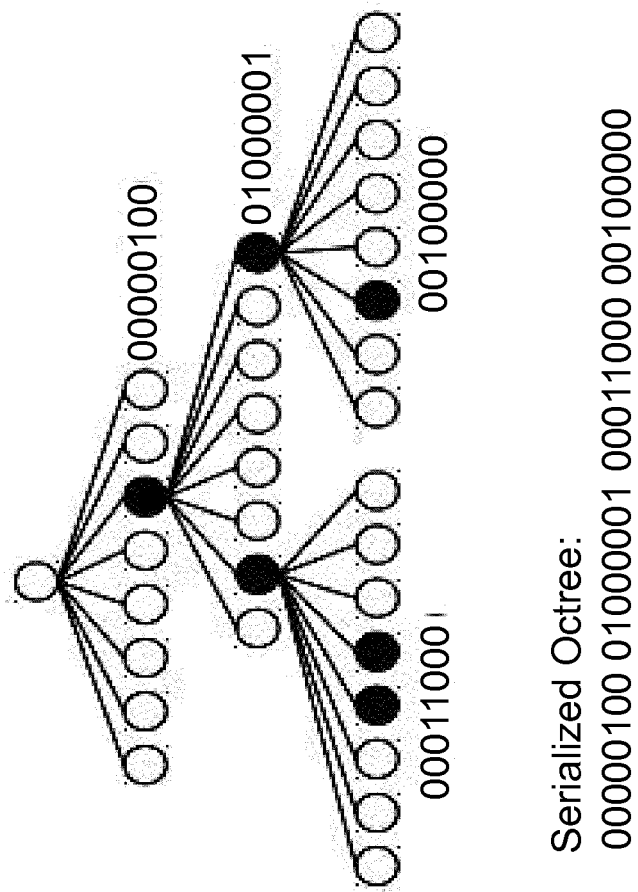
FIG. 2 already described, is a schematic view illustrating an overview of an octree data structure.
Figure 2:
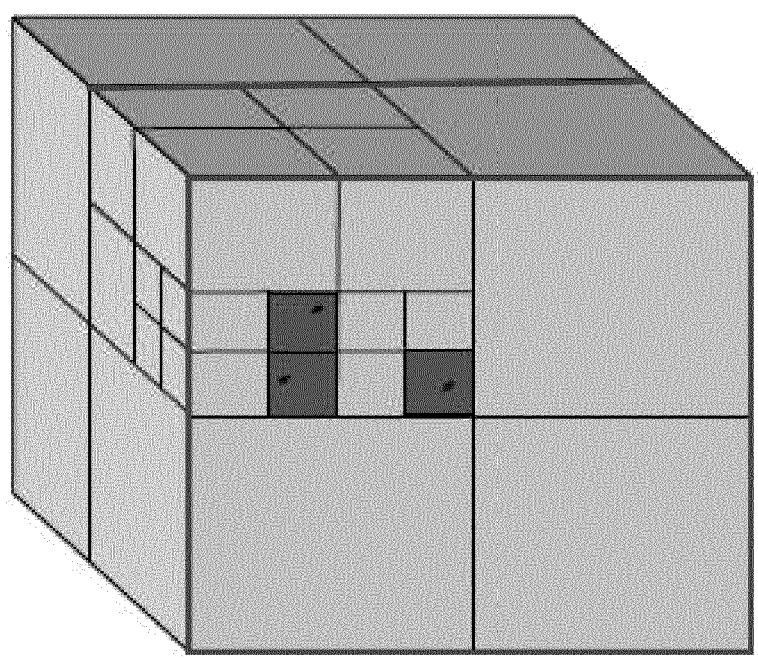
Figure 3:
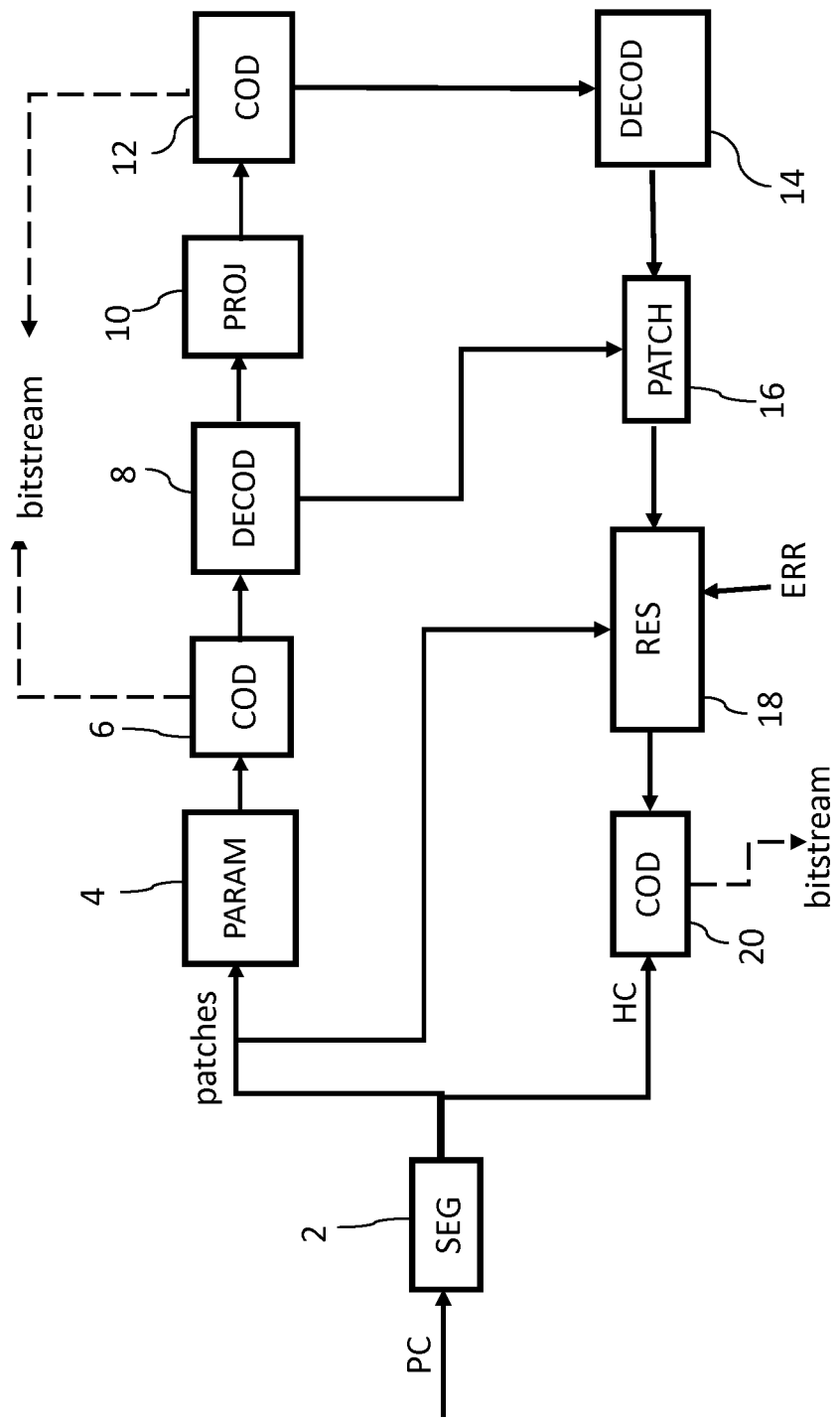
FIG. 3 is a flowchart showing the steps of encoding a point cloud, according to an embodiment of the present disclosure.

The method of encoding a point cloud according to an embodiment of the present invention is illustrated in the flowchart of FIG. 3.

The 3D point cloud is first segmented at step 2 into patches which can be approximated by planes, called as plane-like patches.

According to an embodiment, the segmentation uses the partitioning described in T. Ochotta and D. Saupe, "Compression of point-based 3d models by shape-adaptive wavelet coding of multi-heightfields" in *Proc. Eurographics Symp. on Point-Based Graphics*, 2004.

Another example is as follows.
For (i=0; i<LOOP$_{NUM}$; i++)
{
Randomly select N points of the point cloud;
Build N plane-like patches, each of which only includes one of the selected N points;
For each patch, add the neighboring points of the points of the patch which don't belong to any plane-like patch, if the patch is still close enough to a plane after the new point is added;
Try to combine patches by checking for each patch, whether or not, after combining the patch with each of its neighboring patches, the new patch is still close enough to a plane. If yes, combine the two patches;
Calculate the reconstruction error between the reconstructed point cloud and the original point cloud;
};
where LOOP$_{NUM}$=$\alpha_{Loop}$*#Pt, N=$\alpha_N$*#Pt, where #Pt is the number of the points in the point cloud, $\alpha_{Loop}$ and $\alpha_N$ are predefined thresholds. For instance, it is possible to choose $\alpha_{Loop}$=0.1 and $\alpha_N$=0.2.

Then, the segmentation results, i.e. the plane-like patches with the minimum reconstruction error are selected.

An error metric can be used to judge whether a subset of points of the point cloud can be approximated by a plane. The points not belonging to any plane-like patches are called high-curvature points.

Then, at step 4, inverse projection parameters of the plane-like patches are determined. These parameters include the positions and/or orientations of the patches.

At step 6, the inverse projection parameters are encoded.

Advantageously, as the patch positions are usually sparsely distributed in the 3D space, the octree decomposition based compression method can efficiently compress the patch positions. The other parameters can be compressed by quantization and entropy coding which are known compression techniques in the art.

According to an embodiment, the patch orientations are encoded using the method described in U.S. Pat. No. 9,214, 042.

The resulting encoded inverse projection parameters are included in the encoded bitstream transmitted to the decoder.

At step 8, the encoded inverse projection parameters are decoded.

At step 10, the first plane-like patches are projected to projected planes using the decoded inverse projection parameters. The projection can be achieved by aligning the object coordinate system of each plane-like patch with the world coordinate system.

Figure 4:
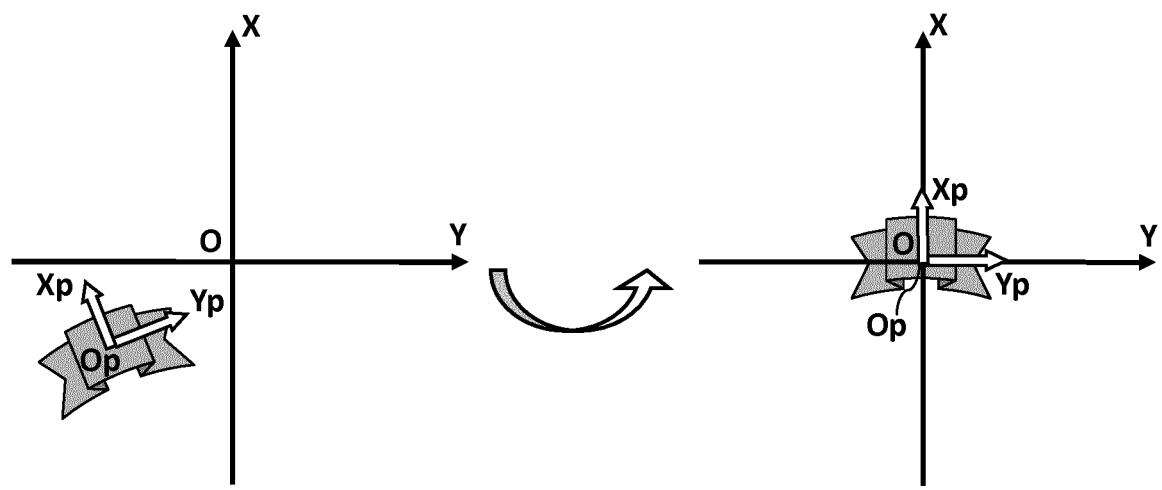
FIG. 4 shows an example of projection of the plane-like patches, according to an embodiment of the present disclosure.

FIG. 4 shows a 2D example in order to explain an embodiment for implementing the projection.

According to this embodiment, the centroid of each patch is translated to the origin of the XYZ coordinate system, and then the orientation axes of each patch are rotated to be aligned with the world coordinate system. The object coordinate system of each plane-like patch can be determined using principle component analysis (PCA). Then, each transformed patch is projected to XOY plane.

Then the projected planes are encoded at step 12 using any suitable patch coding method, such as the method described in T. Ochotta and D. Saupe, "Compression of point-based 3d models by shape-adaptive wavelet coding of multi-heightfields" in *Proc. Eurographics Symp. on Point-Based Graphics*, 2004.

The resulting data of the encoded projected planes are included in the encoded bitstream transmitted to the decoder.

Then, the encoded projected planes are decoded at step 14.

The decoded projected planes are used together with the decoded inverse projection parameters, at step 16, to reconstruct plane-like patches. Using the decoded patch orientations, the plane-like patches are first rotated to make the X, Y and Z axes paralleled with the three orientation axes. Then, the rotated patches are translated to make the origin (0, 0, 0) overlapped with the decoded patch position.

Then, at step 18, the original plane-like patches, obtained at step 2, are compared with the reconstructed plane-like patches, obtained at step 16. A reconstruction error of each point belonging to the original plane-like patches is calculated.

The points with reconstruction errors larger than a threshold ERR preferably corresponding to a user required reconstruction error are considered as residual points.

At step 20, the high-curvature points and the residual points, forming the set of sparse points, are encoded using an octree decomposition based compression method such as the method described in J. Peng and C.-C. Jay Kuo, "Geometry-guided progressive lossless 3D mesh coding with octree (OT) decomposition," ACM Trans. Graph, vol. 21, no. 2, pp. 609-616, July 2005.

The data resulting from the octree coding in step 20 are included in the encoded bitstream transmitted to the decoder.

According to a preferred embodiment, the encoded bitstream includes:

A header, containing the number of the plane-like patches, lengths of each compressed projected plane, length of the compressed positions of the plane-like patches, depth of the octree used to compress the plane-like patch positions, the bounding box of all plane-like patch positions, the length of the compressed orientations of plane-like patches, the quantization parameter of the orientations of the plane-like patches, the length of the compressed sparse points, the depth of the octree used to compress the sparse points and the bounding box of all the sparse points, The compressed projected plane-like patches one by one, sorted by the decoding order of the plane-like patch positions, The compressed plane-like patch positions, The compressed plane-like patch orientations one by one, sorted by the decoding order of the plane-like patch positions, The compressed sparse points.

Figure 5:
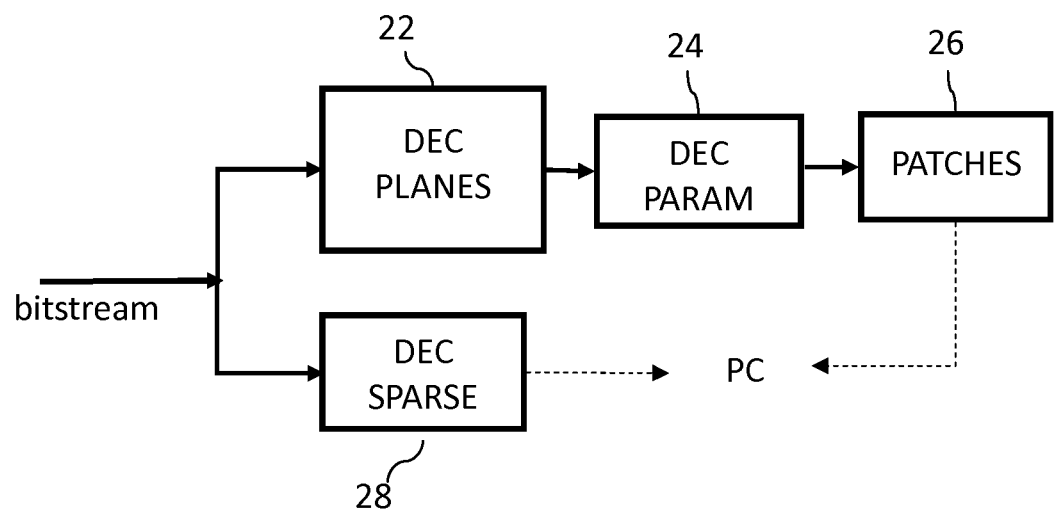
FIG. 5 is a flowchart showing the steps of reconstructing a point cloud, according to an embodiment of the present disclosure.

FIG. 5 shows the steps of reconstructing a point cloud, i.e. the decoding steps implemented by the decoder after receiving the encoded bitstream including the encoded inverse projection parameters, the encoded projected planes and the encoded sparse points.

At step 22, the projected plane-like patches are decoded.

Then, at step 24, the inverse projection parameters are decoded.

According to a preferred embodiment, the plane-like patch positions are reconstructed at step 26 using the length of the compressed positions of the plane-like patches, the depth of the octree used to compress the plane-like patch positions and the bounding box of all plane-like patch positions. Then, the plane-like patch orientations are reconstructed using the length of the compressed orientations of plane-like patches and the quantization parameter of the orientations of the plane-like patches.

The sparse points, comprising the high-curvature points and the residual points, are decoded at step 28 using the length of the compressed sparse points, the depth of the octree used to compress the sparse points and the bounding box of the sparse points.

The decoding steps 22 and 24 are exchangeable and they may also be performed simultaneously with the step 28.

The resulting decoded patches and decoded sparse points form the decoded point cloud.

Figure 6:
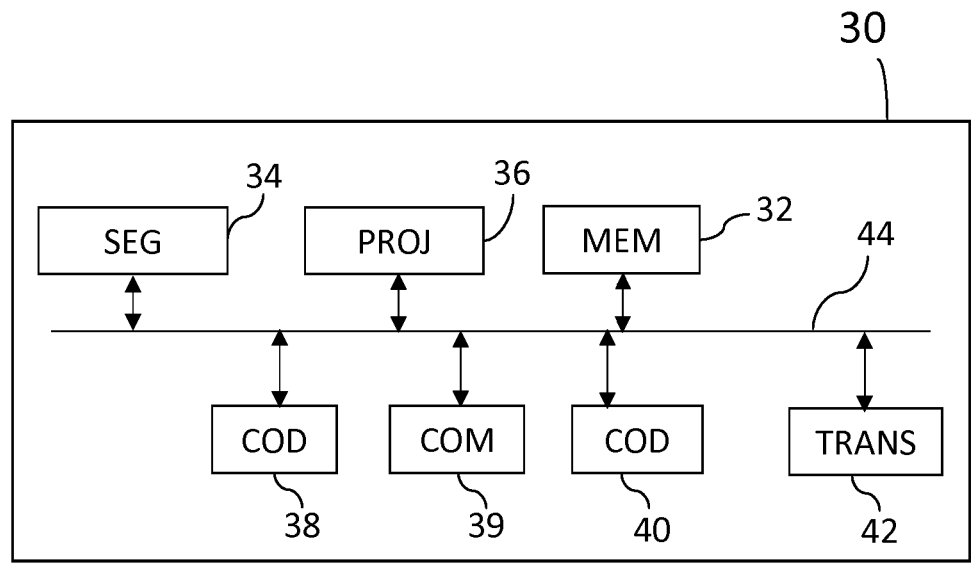
FIG. 6 is a schematic view illustrating an encoder, according to an embodiment of the invention.

FIG. 6 is a block diagram of an exemplary embodiment of an encoder 30 implementing the encoding method of the present disclosure.

Advantageously, the encoder 30 includes one or more processors and a memory 32.

The encoder 30 includes:
- a segmentation module 34 configured to segment the point cloud into first plane-like patches;
- a projection module 36 configured to determine inverse projection parameters of the first plane-like patches and to project the first plane-like patches to projected planes using the inverse projection parameters;
- a first coding module 38 configured to encode the projected planes;
- a computation module 39 configured to determine sparse points in the point cloud; and
- a second coding module 40 configured to encode the sparse points using an octree-decomposition.

According to a preferred embodiment, the first coding module is configured to encode and decode the inverse projection parameters.

The encoder 30 also includes a transmitter 42 configured to transmit to a decoder an encoded bitstream including the encoded projected planes, the encoded sparse-points and the encoded projection parameters.

According to the represented embodiment, a bus 44 provides a communication path between various elements of the encoder 30. Other point-to-point interconnection options (e.g. non-bus architecture) are also feasible.

Figure 7:
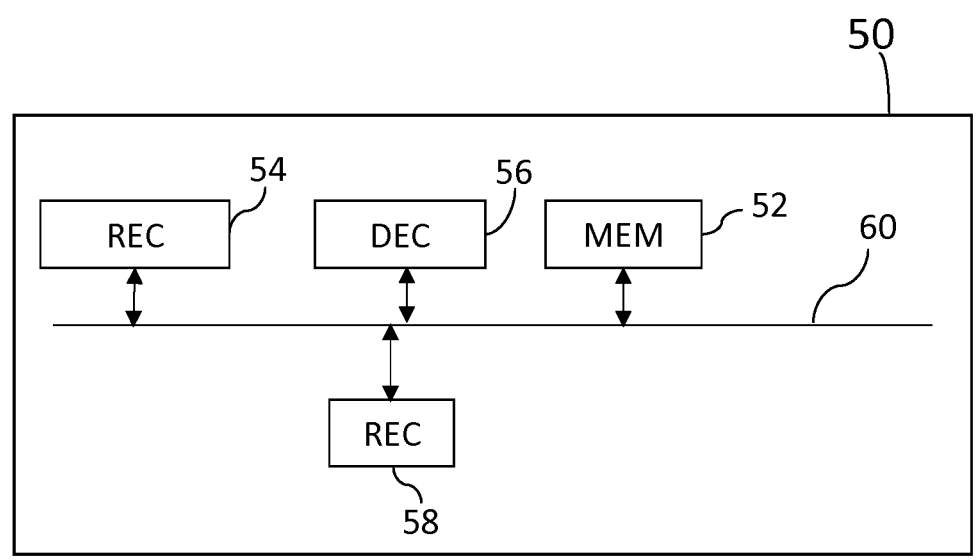
FIG. 7 is a schematic view illustrating a decoder, according to an embodiment of the invention.

FIG. 7 is a block diagram of an exemplary embodiment of a decoder 50 implementing the reconstructing method of the present disclosure.

Advantageously, the decoder 50 includes one or more processors and a memory 52.

The decoder 50 includes:
- a receiver 54 configured to receive an encoded bitstream including encoded projected planes and encoded sparse points;
- a decoding module 56 configured to decode the received encoded bitstream; and
- a reconstruction module 58 configured to reconstruct plane-like patches of the point cloud According to the represented embodiment, a bus 60 provides a communication path between various elements of the decoder 50. Other point-to-point interconnection options (e.g. non-bus architecture) are also feasible.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention is not limited to the particular embodiments disclosed, but that the invention includes all embodiments falling within the scope of the appended claims.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed to be a reference to the plural and vice versa.

A person skilled in the art will readily appreciate that various parameters disclosed in the description may be modified and that various embodiments disclosed and/or claimed may be combined without departing from the scope of the invention.

The invention claimed is:

1. A method comprising:
   obtaining at least one original plane-like patch by segmenting at least part of a point cloud;
   obtaining at least one reconstructed plane-like patch based on a reconstruction of a corresponding projected plane and inverse projection parameters;
   determining at least one sparse point not belonging to any reconstructed plane-like patch in said at least part of the point cloud by using, for each point of said at least one original plane-like patch, a reconstruction error indicating if the point belongs to a reconstructed plane-like patch, the reconstruction error being calculated between the point of said at least one original plane-like patch and a corresponding point of said at least one reconstructed plane-like patch; and
   encoding said at least one sparse point.

2. The method of claim 1, wherein, a point belongs to a reconstructed plane-like patch if the reconstruction error is below a threshold.

3. The method of claim 2, wherein the at least one sparse point includes a residual point for which the reconstruction error is larger than the threshold.

4. The method of claim 2, wherein the reconstruction error is compared to the threshold for each point of said at least one original plane-like patch.

5. An apparatus comprising one or more processors configured to:
obtain at least one original plane-like patch by segmenting at least part of a point cloud;
obtain at least one reconstructed plane-like patch based on a reconstruction of a corresponding projected plane and inverse projection parameters;
determine at least one sparse point not belonging to any reconstructed plane-like patch in said at least part of the point cloud by using, for each point of said at least one original plane-like patch, a reconstruction error indicating if the point belongs to a reconstructed plane-like patch, the reconstruction error being calculated between the point of said at least one original plane-like patch and a corresponding point of said at least one reconstructed plane-like patch; and
encode said at least one sparse point.

6. The apparatus of claim 5, wherein, a point belongs to a reconstructed plane-like patch if the reconstruction error is below a threshold.

7. The apparatus of claim 6, wherein the at least one sparse point includes a residual point for which the reconstruction error is larger than the threshold.

8. The apparatus of claim 6, wherein the reconstruction error is compared to the threshold for each point of said at least one original plane-like patch.

9. A computer-readable program comprising computer-executable instructions to enable a computer to perform a method comprising:
obtaining at least one original plane-like patch by segmenting at least part of a point cloud;
obtaining at least one reconstructed plane-like patch based on a reconstruction of a corresponding projected plane and inverse projection parameters;
determining at least one sparse point not belonging to any reconstructed plane-like patch in said at least part of the point cloud by using, for each point of said at least one original plane-like patch, a reconstruction error indicating if the point belongs to a reconstructed plane-like patch, the reconstruction error being calculated between the point of said at least one original plane-like patch and a corresponding point of said at least one reconstructed plane-like patch; and
encoding said at least one sparse point.

10. The computer-readable program of claim 9, wherein, a point belongs to a reconstructed plane-like patch if the reconstruction error is below a threshold.

11. The computer-readable program of claim 10, wherein the at least one sparse point includes a residual point for which the reconstruction error is larger than the threshold.

12. The computer-readable program of claim 10, wherein the reconstruction error is compared to the threshold for each point of said at least one original plane-like patch.

13. A non-transitory computer readable medium containing data content generated according to a method comprising:
obtaining at least one original plane-like patch by segmenting at least part of a point cloud;
obtaining at least one reconstructed plane-like patch based on a reconstruction of a corresponding projected plane and inverse projection parameters;
determining at least one sparse point not belonging to any reconstructed plane-like patch in said at least part of the point cloud by using, for each point of said at least one original plane-like patch, a reconstruction error indicating if the point belongs to a reconstructed plane-like patch, the reconstruction error being calculated between the point of said at least one original plane-like patch and a corresponding point of said at least one reconstructed plane-like patch; and
encoding said at least one sparse point.

14. The non-transitory computer readable medium of claim 13, wherein, a point belongs to a reconstructed plane-like patch if the reconstruction error is below a threshold.

15. The non-transitory computer readable medium of claim 14, wherein the at least one sparse point includes a residual point for which the reconstruction error is larger than the threshold.

16. The non-transitory computer readable medium of claim 14, wherein the reconstruction error is compared to the threshold for each point of said at least one original plane-like patch.

* * * * *